US009558157B2

(12) United States Patent
Steinhardt et al.

(10) Patent No.: US 9,558,157 B2
(45) Date of Patent: Jan. 31, 2017

(54) SENSOR SYSTEM FOR INDEPENDENTLY EVALUATING THE ACCURACY OF THE DATA OF THE SENSOR SYSTEM

(71) Applicant: Continental Teves AG & Co. OHG, Frankfurt (DE)

(72) Inventors: Nico Steinhardt, Frankfurt (DE); Hermann Winner, Bietigheim (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 407 days.

(21) Appl. No.: 14/353,847

(22) PCT Filed: Oct. 24, 2012

(86) PCT No.: PCT/EP2012/071091
§ 371 (c)(1),
(2) Date: Apr. 24, 2014

(87) PCT Pub. No.: WO2013/060749
PCT Pub. Date: May 2, 2013

(65) Prior Publication Data
US 2014/0300512 A1    Oct. 9, 2014

(30) Foreign Application Priority Data

Oct. 24, 2011  (DE) .......................... 10 2011 085 134
Nov. 21, 2011  (DE) .......................... 10 2011 086 710
May 2, 2012    (DE) .......................... 10 2012 207 297

(51) Int. Cl.
*G01S 19/49* (2010.01)
*G06F 17/18* (2006.01)
*G01D 1/00* (2006.01)

(52) U.S. Cl.
CPC ................ *G06F 17/18* (2013.01); *G01D 1/00* (2013.01); *G01S 19/49* (2013.01)

(58) Field of Classification Search
CPC ............ G01S 19/49; G01S 19/48; G01D 1/00; G06F 17/18
(Continued)

(56) References Cited

U.S. PATENT DOCUMENTS 7,376,499 B2    5/2008 Salman et al.
2004/0102900 A1    5/2004 Ibrahim et al.
(Continued)

FOREIGN PATENT DOCUMENTS

DE    10 2006 029 148 A1    1/2008
DE    10 2010 063 984 A1    8/2011
(Continued)

OTHER PUBLICATIONS

PCT International Search Report—Jan. 15, 2013.
(Continued)

*Primary Examiner* — Harry Liu
(74) *Attorney, Agent, or Firm* — Brinks Gilson & Lione

(57) ABSTRACT

A sensor system, having a plurality of sensor elements configured such that they sense at least to some extent different primary measured variables use at least to some extent different measurement principles, a signal processing device. The signal processing device is configured to evaluate the sensor signals from the sensor elements at least to some extent collectively and rates the information quality of the sensor signals, wherein the signal processing device provides a piece of information about the accuracy of at least one datum of a physical variable. The signal processing device is configured such that the information about the accuracy is described in at least one characteristic quantity or a set of characteristic quantities.

14 Claims, 1 Drawing Sheet

(58) Field of Classification Search
USPC .......................................... 342/357.32, 357.31
See application file for complete search history.

(56) References Cited

U.S. PATENT DOCUMENTS

| | | | | |
|---|---|---|---|---|
| 2008/0238771 | A1* | 10/2008 | Katayama | G01C 21/28 342/357.31 |
| 2010/0019963 | A1* | 1/2010 | Gao | G01S 5/0027 342/357.31 |
| 2011/0071755 | A1* | 3/2011 | Ishigami | G01C 21/165 701/478.5 |

FOREIGN PATENT DOCUMENTS

| | | |
|---|---|---|
| EP | 0 498 655 A2 | 8/1992 |
| EP | 2 128 645 A1 | 12/2009 |
| WO | WO 95/34850 | 12/1995 |

OTHER PUBLICATIONS

German Examination Report—Mar. 21, 2014.
Stochastic Models, Estimation, and Control—P. Maybeck 1979.
An Introduction to the Kalman Filter—Welch & Bishop—Jul. 24, 2006.
Novel Approaches to Adaptive Estimation of Kalman Filter—Yanrui Geng.

* cited by examiner

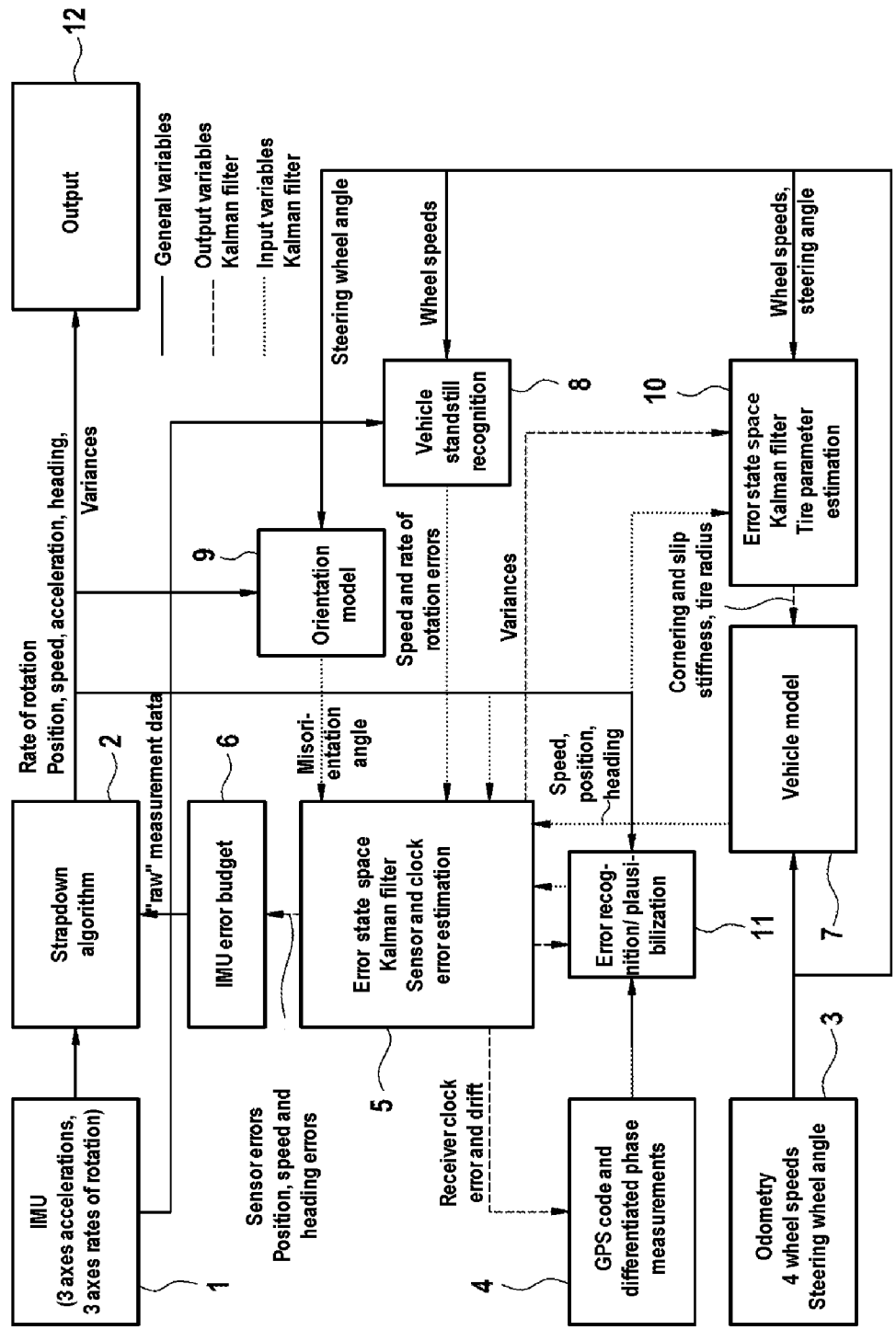

SENSOR SYSTEM FOR INDEPENDENTLY EVALUATING THE ACCURACY OF THE DATA OF THE SENSOR SYSTEM

CROSS REFERENCE TO RELATED APPLICATIONS

This application claims priority to German Patent Application Nos. 10 2011 085 134.8, filed Oct. 24, 2011; 10 2011 086 710.4, filed Nov. 21, 2011; 10 2012 207 297.7, filed May 2, 2012; and PCT/EP2012/071091, filed Oct. 24, 2012.

FIELD OF THE INVENTION

The invention relates to a sensor system having a plurality of sensor elements in a form such that they sense at least to some extent different primary measured values and/or use at least to some extent different measurement principles and to a signal processing device, and to the use thereof in motor vehicles, particularly in automobiles.

BACKGROUND

Laid-open specification DE 10 2010 063 984 A1 describes a sensor system, having a plurality of sensor elements and a signal processing device, wherein the signal processing device is designed such that the output signals from the sensor elements are evaluated collectively.

Laid-open specification DE 10 2010 063 984 A1 describes a sensor system, having a plurality of sensor elements and a signal processing device, wherein the signal processing device is designed such that the output signals from the sensor elements are evaluated collectively.

The invention is based on the object of proposing a sensor system that affords or allows a relatively high level of inherent safety with regard to its signal processing and/or that is suitable for safety-critical applications or a safety-critical use.

This object is achieved by the sensor system according to the specification drawings and appended claims.

SUMMARY AND INTRODUCTORY DESCRIPTION OF THE INVENTION

The term datum is expediently understood herein to mean the singular of the term data.

A primary measured variable is preferably understood herein to mean the measured variable that the sensor element is primarily designed to sense and that is sensed directly, in particular.

The information about the accuracy is expediently contained and/or coded in at least one characteristic quantity or a set of characteristic quantities and/or is formed by the characteristic quantity or the set of characteristic quantities or the values or data thereof.

It is preferred that the information about the accuracy is described in at least one datum or in data of a characteristic quantity or of a set of characteristic quantities or is defined or definable in this datum or these data.

It is preferred that the signal processing device is in a form such that it has at least one sensor information source channel that forwards and processes at least one output signal from a sensor element.

The signal processing device is preferably in a form such that it provides and in particular assigns the at least one characteristic quantity or the set of characteristic quantities in each case for/to a datum of a physical variable, in particular in each case, after or at successive signal processing steps of the signal processing device, and the data of the at least one characteristic quantity or of the set of characteristic quantities are dependent on how the associated or the preceding signal processing step influences that processed datum of the physical variable to which the at least one characteristic quantity or the set of characteristic quantities relates.

It is preferred that the signal processing device is in a form such that the at least one characteristic quantity is defined or definable as at least one of the following variables, particularly in order to describe a data quality, namely;
a noise characteristic quantity,
an offset/bias characteristic quantity,
a scale factor characteristic quantity,
a nonlinearity characteristic quantity,
an offset and/or scale factor drift characteristic quantity,
a bandwidth/cutoff frequency characteristic quantity, and/or
a delay/dead time characteristic quantity.

As an alternative preference, the signal processing device is in a form such that the set of characteristic quantities includes at least three or all of the following variables, particularly in order to describe a data quality, namely;
a noise characteristic quantity,
an offset/bias characteristic quantity,
a scale factor characteristic quantity,
a nonlinearity characteristic quantity,
an offset and/or scale factor drift characteristic quantity,
a bandwidth/cutoff frequency characteristic quantity, and/or
a delay/dead time characteristic quantity.

Noise or a noise characteristic quantity is preferably understood to mean a band-limited, mean-value-free random distribution of the measured values about the expected value. Noise is independent of the operating point and approaches the expected value in the event of averaging of infinite length. The noise or the noise characteristic quantity is, in particular, defined as a stochastic, mean-value-free error.

Offset/bias or an offset/bias characteristic quantity is preferably understood herein to mean a value that is independent of the operating point, that is assumed to be constant for unaltered ambient conditions and that is additively superimposed on the measurement results. The offset/bias or the offset/bias characteristic quantity is an additive error, in particular.

A scale factor error or a scale factor characteristic quantity is preferably understood herein to mean a value that is dependent on the operating point, that is assumed to be constant for unaltered ambient conditions and that is multiplied by the measured value following deduction of the offset. The scale factor error or the scale factor characteristic quantity is a multiplicative error, in particular.

An offset/scale factor drift or an offset and/or scale factor drift characteristic quantity is preferably understood to mean an alteration in offset or scale factor error over time that can be attributed to changing ambient conditions, e.g. temperature changes, fluctuations in the supply voltage. The offset/scale factor drift or the offset and/or scale factor drift characteristic quantity corresponds to a maximum rate of change over time, in particular.

A bandwidth/a cutoff frequency or a bandwidth/cutoff frequency characteristic quantity is preferably understood to mean a frequency range of the useful signal, possibly for interference rejection.

A delay/dead time or a delay/dead time characteristic quantity is preferably understood to mean an average group propagation delay within the bandwidth.

It is preferred that the signal processing device is in a form such that it provides the at least one characteristic quantity or the set of characteristic quantities for each datum of a defined physical variable after or at each, or each essential, signal processing step.

The signal processing device is preferably in a form such that it provides the at least one characteristic quantity or the set of characteristic quantities for each datum of a plurality of defined physical variables, particularly all the essential physical variables, which are output variables from the sensor system, at or after each essential signal processing step and for each signal source, particularly for the output of a sensor element.

It is preferred that the signal processing device is in a form such that the set of characteristic quantities directly forms an accuracy measure, or an accuracy measure is described indirectly on the basis of a plurality of characteristic quantities from the set of characteristic quantities. In particular, the signal processing device is in a form such that the accuracy measure is rated in respect of or on the basis of a threshold value and then at least one datum of a physical variable is assigned a rating in respect of the accuracy, particularly whether the relevant datum of the physical variable is provided with sufficient or insufficient accuracy, and that this rating of the accuracy is taken into account in at least one of the subsequent signal processing steps.

Rating of the/an accuracy measure in respect of a threshold value is expediently understood to mean a drop below and/or rise above one or more threshold values or a combination of various defined threshold values that are defined with reference to one or more individual or combined and/or derived characteristic quantities.

The accuracy measure is expediently not an individual value but rather is obtained from defined data or values of the at least one characteristic quantity or of the set of characteristic quantities.

It is preferred that the signal processing device is in a form such that it performs anticipatory and/or predictive calculation and/or estimation of at least one accuracy measure for at least one value of a physical variable, wherein this value of the physical variable and the associated accuracy measure are based on the probable and/or predictive presence thereof at or after one or more signal processing steps before said one or more signal processing steps themselves are performed. In particular, the signal processing device is in a form such that, in the course of the anticipatory and/or predictive calculation and/or estimation, it relates the probable and/or predictive presence of the accuracy measure to a defined period of time from the current instant to a defined instant in the future, this defined instant in the future occurring particularly at or after a signal processing step.

It is expedient that the signal processing device is in a form such that, in the course of the anticipatory and/or predictive calculation and/or estimation, it uses data and/or measurement data that are already available in the sensor system, particularly up to the current instant. Since calculation/estimation takes place in the future, a "worst-case" scenario is assumed for the calculation, which is based on there being no new measurement data available for sensor information source channels, since these measurement data are not yet available, of course. However, the result of the calculation therefore relates particularly to an accuracy measure that would materialize in the event of failure of all the sensor elements, hence the "worst-case" scenario.

It is preferred that the signal processing device is in a form such that the anticipatory and/or predictive calculation and/or estimation is performed repeatedly or at least twice in succession, this repetition or succession being based on successive signal processing steps, and this repeated or at least twice-successive predictive calculation and/or estimation relating to the same instant or signal processing step in the future at or after which the predicted accuracy measure is present, wherein in particular potentially newly added measurement data from one or more sensor information source channels are taken into account in the course of the repeated calculation and/or estimation and/or the calculation and/or the estimation or the corresponding result(s) therefrom are corrected.

In this case, potentially newly added measurement data expediently mean newly available measurement data whose availability is not yet certain.

It is expedient that the signal processing device is in a form such that, in the course of the anticipatory and/or predictive calculation and/or estimation, the defined period of time from the current instant to a defined instant in the future and/or a defined number of signal processing steps, before said signal processing steps themselves are performed, are prescribed and, on the basis thereof, the accuracy measure is calculated and/or estimated for a value of a physical variable at this instant that is in the future or at or after this future signal processing step and at the same time or thereafter particularly this accuracy measure is rated in respect of a threshold value.

The signal processing device is preferably in a form such that, in the course of an anticipatory and/or predictive calculation and/or estimation, the accuracy measure is prescribed for a value that is present in the future for a physical variable and, on the basis thereof, the defined period of time from the current instant to a defined instant in the future is calculated or estimated and/or a defined number of future signal processing steps are calculated and/or estimated, particularly until the accuracy measure drops below or rises above a defined threshold value, with particular preference wherein the drop below or rise above the defined threshold value occurs with a defined probability that is particularly preferably likewise prescribed.

The signal processing device is preferably in a form such that the accuracy measure in the form of at least one characteristic quantity or a set of characteristic quantities or appropriate data and/or values or values of at least one physical variable that are derived and/or calculated therefrom is stored for a defined number of signal processing steps and/or for a defined storage time period. In this case or thereafter, the anticipatory and/or predictive calculation and/or estimation of the probable and/or predictive accuracy measure or the anticipatory and/or predictive calculation and/or estimation of a period of time or a defined number of signal processing steps in the future takes place, on the basis of a prescribed accuracy measure or a prescribed threshold value for an accuracy measure taking into account the time profile or a trend or the changes in the stored data and/or values for physical variables and/or characteristic quantities or sets of characteristic quantities. In this case, it is particularly assumed that new measurement data or data follow the previous profile or trend and/or that the system properties, particularly preferably based on the measurement data, do not substantially change.

It is expedient that a defined minimum accuracy is estimated or calculated as the accuracy measure.

The accuracy measure is convertable, in particular, or is converted by the signal processing device into an uncertainty measure.

It is preferred that the signal processing device has a fusion filter that provides a defined fusion data record in the course of the collective evaluation of at least the sensor signals and/or signals derived therefrom from the sensor elements, wherein said fusion data record has in each case data for defined physical variables, wherein the fusion data record includes, for at least one physical variable, a value of said physical variable and a piece of information about the data quality thereof.

The accuracy measure or the information about the accuracy is expediently provided for at least one value of one or more or all the physical variables of the fusion data record.

The accuracy measure or the information about the accuracy is preferably provided for all the output values of all the variables, particularly all the physical variables, that are output variables from the sensor system.

Measurement data are expediently understood to mean the output signals or data from the sensor elements or sensor information source channels.

The fusion filter is preferably in the form of a Kalman filter, with alternative preference in the form of a particle filter, or alternatively in the form of an information filter or alternatively in the form of an "unscented" Kalman filter.

It is preferred that the fusion filter is in a form such that the fusion data record includes a relative value, particularly an offset value and/or change value and/or correction value and/or error value, as the value of the at least one physical variable.

It is expedient that the relative values of the respective physical variables of the fusion data record are correction values that each have an associated piece of variation information or a variation or variation measure, in particular a variance, as information about the data quality thereof.

It is preferred that the fusion filter is in a form such that the value of at least one physical variable of the fusion data record is calculated on the direct or indirect basis of sensor signals from a plurality of sensor elements, wherein these sensor elements sense this at least one physical variable redundantly in a direct or indirect manner. This redundant sensing is particularly preferably implemented as direct or parallel redundancy and/or implemented as analytical redundancy, from computationally derived or deduced variables/values and/or model assumptions.

The fusion filter is preferably in the form of a Kalman filter that iteratively carries out at least prediction steps and correction steps and at least to some extent provides the fusion data record. In particular, the fusion filter is in the form of an error state space extended sequential Kalman filter, that is to say in the form of a Kalman filter, that particularly preferably includes a linearization and in which error state information is calculated and/or estimated and/or that operates sequentially and in this case uses/takes into account the input data available in the respective function step of the sequence.

It is expedient that the sensor system has an inertial sensor arrangement, including at least one acceleration sensor element and at least one rate of rotation sensor element, and that the sensor system includes a strapdown algorithm unit, in which a strapdown algorithm is carried out, by means of which at least the sensor signals from the inertial sensor arrangement are processed to form, in particular corrected, navigation data and/or driving dynamics data, based on the vehicle in which the sensor system is arranged.

It is particularly preferred that the strapdown algorithm unit provides its calculated navigation data and/or driving dynamics data for the fusion filter directly or indirectly.

The sensor system preferably has an inertial sensor arrangement that is in a form such that it can sense at least the acceleration along a second defined axis, particularly the transverse axis of the vehicle, and at least the rate of rotation about a third defined axis, particularly the vertical axis of the vehicle, wherein the first and third defined axes form a generating system, and in this case are oriented in particular perpendicularly with respect to one another, wherein the sensor system furthermore has at least one wheel speed sensor element, particularly at least or precisely four wheel speed sensor elements, which sense the wheel speed of a wheel or the wheel speeds of a respective one of the wheels of the vehicle and in particular additionally sense the direction of rotation of the associated wheel of the vehicle in which the sensor system is arranged, wherein the sensor system additionally includes at least one steering angle sensor element that senses the steering angle of the vehicle, and wherein the sensor system furthermore includes a satellite navigation system that is particularly in a form such that it captures and/or provides the distance data in each case between the associated satellite and the vehicle or a variable that is dependent thereon and also speed information data in each case between the associated satellite and the vehicle or a variable that is dependent thereon.

With particular preference, the inertial sensor arrangement is in a form such that it can sense at least the accelerations along a first, a second and a third defined axis, and at least the rates of rotation about this first, about this second and about this third defined axis, wherein said first, second and third defined axes form a generating system, and in this case are oriented particularly in each case perpendicularly with respect to one another.

It is preferred that the inertial sensor arrangement provides its sensor signals for the strapdown algorithm unit, and the strapdown algorithm unit is in a form such that it calculates and/or provides at least from the sensor signals from the inertial sensor arrangement and also particularly from at least one piece of error state information and/or variance and/or piece of information about the data quality that is associated with a sensor signal or with a physical variable and is provided by the fusion filter, as measurement variables and/or navigation data and/or driving dynamics data, at least corrected accelerations along the first, second and third defined axes, at least corrected rates of rotation about these three defined axes, at least one speed with respect to these three defined axes, and at least one position variable.

It is expedient that the sensor system is in a form such that in each case at least one sensor signal and/or a physical variable as a direct or derived variable of the inertial sensor arrangement and/or of the strapdown algorithm unit, of the wheel speed sensor elements and of the steering angle sensor element, in particular indirectly via a vehicle model unit, and also of the satellite navigation system, in this case in particular distance data in each case between the associated satellite and the vehicle or a variable that is dependent thereon and also speed information data in each case between the associated satellite and the vehicle or a variable that is dependent thereon, are provided for the fusion filter and taken into account by the fusion filter during the calculations thereof.

It is particularly preferred that the vehicle model unit is in a form such that, from the sensor signals from the wheel speed sensor elements and from the steering angle sensor element, the speed along the first defined axis, the speed along the second defined axis and the rate of rotation about the third defined axis are calculated.

It is quite particularly preferred that the vehicle model unit is in a form such that it uses for calculation a least square error method for solving an overdetermined system of equations, known in particular as a least squared error method.

It is expedient that the vehicle model unit is in a form such that it takes into account at least the following physical variables and/or parameters during its calculation: a) the steering angle of each wheel, sensed in particular by the steering angle sensor for the two front wheels, wherein the model assumption is made that the steering angle of the rear wheels is equal to zero or that the steering angle of the rear wheels is additionally sensed, b) the wheel speed or a variable that is dependent thereon for each wheel, c) the direction of rotation of each wheel, d) the dynamic radius and/or wheel diameter of each wheel, and e) the track width of each axle of the vehicle and/or the wheel base between the axles of the vehicle.

The signal processing device is preferably in a form such that the fusion filter calculates and/or provides and/or outputs the fusion data record at defined instants.

The fusion filter is preferably in a form such that it calculates and/or provides and/or outputs the fusion data record independently of the sampling rates and/or sensor signal output instants of the sensor elements, particularly of the wheel speed sensor elements and the steering angle sensor element, and independently of temporal signal or measured variable or information output instants of the satellite navigation system.

It is expedient that the signal processing device is in a form such that in the course of a function step of the fusion filter always, in particular asynchronously, the newest— available to the fusion filter—information and/or signals and/or data from the sensor elements, particularly from the wheel speed sensor elements and the steering angle sensor element, directly or indirectly, particularly by means of the vehicle model unit, and from the satellite navigation system directly or indirectly, are sequentially updated and/or included in the fusion filter and are taken into account during the calculation of the associated function step of the fusion filter.

Furthermore, the invention relates to the use of the sensor system in vehicles, particularly motor vehicles, particularly preferably in automobiles.

In addition, the invention relates particularly to a method that is executed or carried out in the sensor system and is disclosed by the above embodiment options/possibilities of the sensor system for the possible method variants.

BRIEF DESCRIPTION OF THE DRAWING

Further preferred embodiments are evident from the subclaims and the description below of an exemplary embodiment with reference to FIG. 1.

FURTHER DESCRIPTION OF THE INVENTION

FIG. 1 shows a schematic illustration of an exemplary embodiment of the sensor system that is provided for arrangement and use in a vehicle. In this case, the sensor elements and the satellite navigation system and also the most important signal processing units of the signal processing device are illustrated as function blocks, as is their interaction among one another.

The sensor system includes an inertial sensor arrangement 1, IMU, "inertial measurement unit", which is in a form such that it can sense at least the accelerations along a first, a second and a third defined axis and at least the rates of rotation about this first, about this second and about the third defined axis, wherein the first defined axis corresponds to the longitudinal axis of the vehicle, the second defined axis corresponds to the transverse axis of the vehicle and the third defined axis corresponds to the vertical axis of the vehicle. These three axes form a Cartesian coordinate system, the vehicle coordinate system.

The sensor system has a strapdown algorithm unit 2 in which a strapdown algorithm is performed, said strapdown algorithm being used to process at least the sensor signals from the inertial sensor arrangement 1 to form corrected navigation data and/or driving dynamics data. These output data from the strapdown algorithm unit 2 may include the data of the following physical variables: the speed, the acceleration and the rate of rotation of the respective vehicle, for example in respect of the three axes of the vehicle coordinate system and, on the basis of the example, additionally in each case based on a world coordinate system that is suitable for describing the orientation and/or dynamic variables of the vehicle in the world. Moreover, the output data from the strapdown algorithm unit 2 includes the position in respect of the vehicle coordinate system and the orientation in relation to the world coordinate system. In addition, the output data from the strapdown algorithm unit have the variances as information about the data quality of the physical variables cited above, at least some of them. On the basis of the example, these variances are not calculated in the strapdown algorithm unit, but rather only used and forwarded by the latter.

The output data from the strapdown algorithm unit are, by way of example, moreover the output data or signals or output data 12 from the entire sensor system.

Moreover, the sensor system includes wheel speed sensor elements 3 for each wheel of the vehicle, on the basis of the example four, which each sense the wheel speeds of one of the wheels of the vehicle and each additionally sense the direction of rotation, and additionally a steering angle sensor element 3 that senses the steering angle of the vehicle. The wheel speed sensor element and the steering angle sensor element form a sensor arrangement 3 for sensing the odometry.

Furthermore, the sensor system has a satellite navigation system 4 that is in a form such that it senses and/or provides the distance data in each case between the associated satellite and the vehicle or a variable that is dependent thereon and also speed information data in each case between the associated satellite and the vehicle or a variable that is dependent thereon. In addition, the satellite navigation system 4, on the basis of the example, provides the fusion filter with a starting position or piece of starting position information, at least in order to start or switch on the sensor system.

Moreover, the signal processing device of the sensor system includes a fusion filter 5. In the course of the collective evaluation of at least the sensor signals and/or signals derived therefrom from the sensor elements 3, that is to say the odometry, and of the output signals from the satellite navigation system 4 and/or signals derived therefrom, the fusion filter 5 provides a defined fusion data record 6. This fusion data record has respective data for defined physical variables, with the fusion data record 6 including, for at least one physical variable, a value for this physical variable and a piece of information about the data quality thereof, this information about the data quality being embodied as a variance on the basis of the example.

The fusion data record 6 includes a relative value, for example a correction value, also called an offset value, as a value for the at least one physical variable. On the basis of the example, the correction value is obtained in each case from the accumulated error values or change values that are provided by the fusion filter 5.

On the basis of the example, the relative values of the respective physical variables of the fusion data record 6 are thus correction values and variances. On the basis of the example, the fusion data record 6, in other words, calculates an error budget that is provided as an input variable or input data record for the strapdown algorithm unit and is at least to some extent taken into account by said strapdown algorithm unit during its calculations. This error budget includes, as a data record or output data, at least correction values or error values for physical variables and also in each case a variance, as a piece of information about the data quality, for each value. In this case, the fusion filter transmits to the strapdown algorithm unit at least the correction values and variances for the physical variables speed, acceleration and rate of rotation, in each case based on the vehicle coordinate system, that is to say in each case the three components of these variables in relation to this coordinate system, and also IMU orientation or the IMU orientation angle between the vehicle coordinate system and the coordinate system or the installation orientation of the inertial sensor arrangement 1 and also the position based on the world coordinate system.

The values of the physical variables of the fusion data record are calculated on the direct or indirect basis of the sensor signals from the sensor elements 3 and from the satellite navigation system 4, with at least some variables, for example the speed and the position of the vehicle in relation to the vehicle coordinates, being sensed and used in a redundant manner with respect to the data of the strapdown algorithm unit 2.

On the basis of the example, the fusion filter 5 is in the form of an error state space extended sequential Kalman filter, that is to say in the form of a Kalman filter that includes a linearization, in particular, and in which the correction values are calculated and/or estimated and that operates sequentially and in this case uses/takes into account the input data available in the respective function step of the sequence.

The fusion filter 5 is in a form such that in the course of a function step of the fusion filter always, asynchronously, the newest—available to the fusion filter—information and/or signals and/or data from the sensor elements 3, that is to say from the wheel speed sensor elements and the steering angle sensor element indirectly by means of a vehicle model unit 7, and from the satellite navigation system 4 directly or indirectly, are sequentially updated and/or included in the fusion filter and are taken into account during the calculation of the associated function step of the fusion filter 5.

The vehicle model unit 7 is in a form such that it calculates, from the sensor signals from the wheel speed sensor elements 3 and from the steering angle sensor element 3, at least the speed along a first defined axis, the speed along a second defined axis and the rate of rotation about a third defined axis and provides them for the fusion filter 5.

On the basis of the example, the sensor system has four wheel speed sensor elements 3, wherein in each case one of the wheel speed sensor elements is associated with each wheel of the vehicle, wherein the vehicle model unit 7 is in a form such that, from the sensor signals from the wheel speed sensor elements and the steering angle, provided by the steering angle sensor unit, and/or the steering angle of each wheel, in particular sensed by the steering angle sensor element for the front wheels and by means of at least one further steering angle sensor element for the rear wheels or at least from a model assumption for the rear wheels, said vehicle model unit directly or indirectly calculates the speed components and/or the speed, of each wheel, along/in relation to the first and second defined axes, wherein, from these eight speed components and/or the four speeds in each case in relation to the first and second defined axes, the speed along a first defined axis, the speed along a second defined axis and the rate of rotation about a third defined axis are calculated.

The sensor system or the signal processing device thereof moreover includes a tire parameter estimation unit 10 that is in a form such that it calculates at least the radius, on the basis of the example the dynamic radius, of each wheel and additionally calculates the cornering stiffness and the slip stiffness of each wheel and provides them for the vehicle model unit 7 as additional input variables, wherein the tire parameter estimation unit 10 is in a form such that it uses a substantially linear tire model for calculating the wheel/tire variables. The input variables of the tire parameter estimation unit on the basis of the example are in this case the wheel speeds 3 and the steering angle 3, at least to some extent or completely the output variables or values from the strapdown algorithm unit 2, particularly the variances provided thereby in addition to the values of the physical variables, and also the variances of the fusion filter 5, with respect to the physical variables that are the input variables for the tire parameter estimation unit 10.

The sensor system or the signal processing device thereof moreover includes a GPS error recognition and plausibilization unit 11 that is in a form such that, on the basis of the example, it receives as input data the output data or output signals from the satellite navigation system 4 and also at least to some extent the output data or output signals from the strapdown algorithm unit 2 and takes them into account in its calculations.

In this case, the GPS error recognition and plausibilization unit 11 is additionally connected to the fusion filter 5 and interchanges data with the latter.

By way of example, the GPS error recognition and plausibilization unit 11 is in a form such that it carries out the following method:

Method for selecting a satellite, including:
 measurement of measurement position data for the vehicle relative to the satellite on the basis of the GNSS signal, that is to say the global navigation satellite system signal, the output signal or the output data from the satellite navigation system 4,
 determination of reference position data for the vehicle that are redundant with respect to the measurement position data determined on the basis of the GNSS signal; and
 selection of the satellite if a comparison of the measurement position data and the reference position data satisfies a predetermined condition,
 wherein a difference between the measurement position data and the reference position data is formed for the purpose of the comparison of the measurement position data and the reference position data,
 wherein the predetermined condition is a maximum permissible error between the error position data and the reference position data,
 wherein the maximum permissible error is dependent on a standard deviation that is calculated on the basis of a sum of a reference variance for the reference position data and a measurement variance for the measurement position data,
 wherein the maximum permissible error corresponds to a multiple of the standard deviation such that a probability that the measurement position data are in a variation interval that is dependent on the standard deviation is below a predetermined threshold value.

The sensor system or the signal processing device thereof moreover has a standstill recognition unit 8 that is in a form such that it can recognize when the vehicle is at a standstill and, in the event of it having been recognized that the vehicle is at a standstill, provides at least the fusion filter 5 with information from a standstill model, in this case particularly the information that the rates of rotation about all three axes have the value zero and at least one position change variable likewise has the value zero and also particularly the speeds along all three axes have the value zero. On the basis of the example, the standstill recognition unit 8 is in this case in a form such that it uses the wheel speeds or wheel speed signals as input data, and also the "raw" or direct output signals from the inertial sensor arrangement 1.

On the basis of the example, the signal processing device calculates and/or uses a first group of data of physical variables whose values relate to a vehicle coordinate system and additionally calculates and/or uses a second group of data of physical variables whose values relate to a world coordinate system, wherein this world coordinate system is suitable particularly at least for describing the orientation and/or dynamic variables of the vehicle in the world, wherein the sensor system has an orientation model unit 9 that is used to calculate the orientation angle between the vehicle coordinate system and the world coordinate system.

The orientation angle between the vehicle coordinate system and the world coordinate system in the orientation model unit 9 is calculated at least on the basis of the following variables: the speed in relation to the vehicle coordinate system, the speed in relation to the world coordinate system and the steering angle.

On the basis of the example, the orientation angle between the vehicle coordinate system and the world coordinate system is calculated in the orientation model unit 9 additionally at least on the basis of one or more of the following variables: a piece of orientation information for the vehicle based on the world coordinate system, some or all of the correction values and/or variances of the fusion filter and/or the acceleration of the vehicle based on the vehicle coordinate system and/or the world coordinate system.

The orientation model unit 9 uses some or all of the output data and/or output signals from the strapdown algorithm unit 2 for calculation.

On the basis of the example, the orientation model unit 9 is in a form such that, in addition to the orientation angle, it also calculates and provides a piece of information about the data quality of this variable, particularly the variance of the orientation angle, wherein the orientation model unit 9 provides the orientation angle between the vehicle coordinate system and the world coordinate system and also the information about the data quality of this variable for the fusion filter 5, and the fusion filter uses this orientation angle in its calculations and particularly preferably forwards the information about the data quality of this variable, particularly the variance of the orientation angle, to the strapdown algorithm unit 2.

On the basis of the example, the information about the accuracy or the characteristic quantity or the set of characteristic quantities is provided for each value of each physical variable at or after each or each essential signal processing step and for each signal source. On the basis of the example, this is in parallel with the signal processing of the values of the physical variables from the sensor elements through to the output signals from the sensor system.

On the basis of the example, the unprocessed raw values or measured values from the sensor elements in this case form the source of the description of the characteristic quantities or of the set of characteristic quantities. These are modified during the further processing of signals per signal processing step.

By way of example, the further processing is classified into three operations: integration, differentiation and filtering. Calculation in accordance with the error class and the error propagation calculation need to be applied; the effects on the characteristic quantities are described by way of example below.

Error propagation in the case of integration as a signal processing step for the signal:
Noise: change in the characteristic, weighting of the power density at $f^2$.
Offset/bias: becomes a drift over the integration time
Scale factor: remains a factor of the integrated signal
Nonlinearity: cancels itself out in the long-term mean over the entire measurement range
Drift: becomes square drift over the integration time
Bandwidth/cutoff frequency: no change, but different characteristic:

$$\frac{1}{f}$$

Delay/dead time: persists, delay in the integral sum
Error propagation in the case of differentiation as a signal processing step for the signal:
Noise: change in the characteristic, weighting of the power density at $f^2$.
Offset/bias: disappears through differentiation
Scale factor: remains a factor of the differentiated signal
Nonlinearity: becomes an operating-point-dependent offset
Drift: becomes an offset
Bandwidth/cutoff frequency: change in the characteristic (high-pass filter character: f)
Delay/dead time: persists
Error propagation in the case of general filtering as a signal processing step for the signal:
Noise characteristic is altered
Change in the bandwidth/cutoff frequencies in line with the filtering
Delay/dead time is extended by
Group propagation delay within the bandwidth
Processing time of the digital filter The accuracy statement about the accuracy measure in the form of the characteristic quantities or the set of characteristic quantities allows—for example in a description based on data sheets—the characterization of measurement data from their source by the signal processing chain of the signal processing device through to their sink, that is to say the output data from the sensor system. On the basis of the example, the accuracy description involves the actual properties of individual measurement data or data of physical variables being addressed by continuously calculating the dynamic specification thereof using the accuracy rating based on a description from data sheets, for example.

These description data or characteristic quantities can be used for at least one user function of the sensor system or of a regulatory system or control system connected to the sensor system. By way of example, adaptive regulation or the accuracy-dependent provision of supplementary functions of driver assistance systems is thus possible.

The invention is based on the object of proposing a sensor system that affords or allows a relatively high level of inherent safety with regard to its signal processing and/or that is suitable for safety-critical applications or a safety-critical use.

This object is achieved by the sensor system according to the specification drawings and appended claims.

SUMMARY AND INTRODUCTORY DESCRIPTION OF THE INVENTION

The term datum is expediently understood herein to mean the singular of the term data.

A primary measured variable is preferably understood herein to mean the measured variable that the sensor element is primarily designed to sense and that is sensed directly, in particular.

The information about the accuracy is expediently contained and/or coded in at least one characteristic quantity or a set of characteristic quantities and/or is formed by the characteristic quantity or the set of characteristic quantities or the values or data thereof.

It is preferred that the information about the accuracy is described in at least one datum or in data of a characteristic quantity or of a set of characteristic quantities or is defined or definable in this datum or these data.

It is preferred that the signal processing device is in a form such that it has at least one sensor information source channel that forwards and processes at least one output signal from a sensor element.

The signal processing device is preferably in a form such that it provides and in particular assigns the at least one characteristic quantity or the set of characteristic quantities in each case for/to a datum of a physical variable, in particular in each case, after or at successive signal processing steps of the signal processing device, and the data of the at least one characteristic quantity or of the set of characteristic quantities are dependent on how the associated or the preceding signal processing step influences that processed datum of the physical variable to which the at least one characteristic quantity or the set of characteristic quantities relates.

It is preferred that the signal processing device is in a form such that the at least one characteristic quantity is defined or definable as at least one of the following variables, particularly in order to describe a data quality, namely;
a noise characteristic quantity,
an offset/bias characteristic quantity,
a scale factor characteristic quantity,
a nonlinearity characteristic quantity,
an offset and/or scale factor drift characteristic quantity,
a bandwidth/cutoff frequency characteristic quantity, and/or
a delay/dead time characteristic quantity.

As an alternative preference, the signal processing device is in a form such that the set of characteristic quantities includes at least three or all of the following variables, particularly in order to describe a data quality, namely;
a noise characteristic quantity,
an offset/bias characteristic quantity,
a scale factor characteristic quantity,
a nonlinearity characteristic quantity,
an offset and/or scale factor drift characteristic quantity,
a bandwidth/cutoff frequency characteristic quantity, and/or
a delay/dead time characteristic quantity.

Noise or a noise characteristic quantity is preferably understood to mean a band-limited, mean-value-free random distribution of the measured values about the expected value. Noise is independent of the operating point and approaches the expected value in the event of averaging of infinite length. The noise or the noise characteristic quantity is, in particular, defined as a stochastic, mean-value-free error.

Offset/bias or an offset/bias characteristic quantity is preferably understood herein to mean a value that is independent of the operating point, that is assumed to be constant for unaltered ambient conditions and that is additively superimposed on the measurement results. The offset/bias or the offset/bias characteristic quantity is an additive error, in particular.

A scale factor error or a scale factor characteristic quantity is preferably understood herein to mean a value that is dependent on the operating point, that is assumed to be constant for unaltered ambient conditions and that is multiplied by the measured value following deduction of the offset. The scale factor error or the scale factor characteristic quantity is a multiplicative error, in particular.

An offset/scale factor drift or an offset and/or scale factor drift characteristic quantity is preferably understood to mean an alteration in offset or scale factor error over time that can be attributed to changing ambient conditions, e.g. temperature changes, fluctuations in the supply voltage. The offset/scale factor drift or the offset and/or scale factor drift characteristic quantity corresponds to a maximum rate of change over time, in particular.

A bandwidth/a cutoff frequency or a bandwidth/cutoff frequency characteristic quantity is preferably understood to mean a frequency range of the useful signal, possibly for interference rejection.

A delay/dead time or a delay/dead time characteristic quantity is preferably understood to mean an average group propagation delay within the bandwidth.

It is preferred that the signal processing device is in a form such that it provides the at least one characteristic quantity or the set of characteristic quantities for each datum of a defined physical variable after or at each, or each essential, signal processing step.

The signal processing device is preferably in a form such that it provides the at least one characteristic quantity or the set of characteristic quantities for each datum of a plurality of defined physical variables, particularly all the essential physical variables, which are output variables from the sensor system, at or after each essential signal processing step and for each signal source, particularly for the output of a sensor element.

It is preferred that the signal processing device is in a form such that the set of characteristic quantities directly forms an accuracy measure, or an accuracy measure is described indirectly on the basis of a plurality of characteristic quantities from the set of characteristic quantities. In particular, the signal processing device is in a form such that the accuracy measure is rated in respect of or on the basis of a threshold value and then at least one datum of a physical variable is assigned a rating in respect of the accuracy, particularly whether the relevant datum of the physical variable is provided with sufficient or insufficient accuracy, and that this rating of the accuracy is taken into account in at least one of the subsequent signal processing steps.

Rating of the/an accuracy measure in respect of a threshold value is expediently understood to mean a drop below and/or rise above one or more threshold values or a combination of various defined threshold values that are defined with reference to one or more individual or combined and/or derived characteristic quantities.

The accuracy measure is expediently not an individual value but rather is obtained from defined data or values of the at least one characteristic quantity or of the set of characteristic quantities.

It is preferred that the signal processing device is in a form such that it performs anticipatory and/or predictive calculation and/or estimation of at least one accuracy measure for at least one value of a physical variable, wherein this value of the physical variable and the associated accuracy measure are based on the probable and/or predictive presence thereof at or after one or more signal processing steps before said one or more signal processing steps themselves are performed. In particular, the signal processing device is in a form such that, in the course of the anticipatory and/or predictive calculation and/or estimation, it relates the probable and/or predictive presence of the accuracy measure to a defined period of time from the current instant to a defined instant in the future, this defined instant in the future occurring particularly at or after a signal processing step.

It is expedient that the signal processing device is in a form such that, in the course of the anticipatory and/or predictive calculation and/or estimation, it uses data and/or measurement data that are already available in the sensor system, particularly up to the current instant. Since calculation/estimation takes place in the future, a "worst-case" scenario is assumed for the calculation, which is based on there being no new measurement data available for sensor information source channels, since these measurement data are not yet available, of course. However, the result of the calculation therefore relates particularly to an accuracy measure that would materialize in the event of failure of all the sensor elements, hence the "worst-case" scenario.

It is preferred that the signal processing device is in a form such that the anticipatory and/or predictive calculation and/or estimation is performed repeatedly or at least twice in succession, this repetition or succession being based on successive signal processing steps, and this repeated or at least twice-successive predictive calculation and/or estimation relating to the same instant or signal processing step in the future at or after which the predicted accuracy measure is present, wherein in particular potentially newly added measurement data from one or more sensor information source channels are taken into account in the course of the repeated calculation and/or estimation and/or the calculation and/or the estimation or the corresponding result(s) therefrom are corrected.

In this case, potentially newly added measurement data expediently mean newly available measurement data whose availability is not yet certain.

It is expedient that the signal processing device is in a form such that, in the course of the anticipatory and/or predictive calculation and/or estimation, the defined period of time from the current instant to a defined instant in the future and/or a defined number of signal processing steps, before said signal processing steps themselves are performed, are prescribed and, on the basis thereof, the accuracy measure is calculated and/or estimated for a value of a physical variable at this instant that is in the future or at or after this future signal processing step and at the same time or thereafter particularly this accuracy measure is rated in respect of a threshold value.

The signal processing device is preferably in a form such that, in the course of an anticipatory and/or predictive calculation and/or estimation, the accuracy measure is prescribed for a value that is present in the future for a physical variable and, on the basis thereof, the defined period of time from the current instant to a defined instant in the future is calculated or estimated and/or a defined number of future signal processing steps are calculated and/or estimated, particularly until the accuracy measure drops below or rises above a defined threshold value, with particular preference wherein the drop below or rise above the defined threshold value occurs with a defined probability that is particularly preferably likewise prescribed.

The signal processing device is preferably in a form such that the accuracy measure in the form of at least one characteristic quantity or a set of characteristic quantities or appropriate data and/or values or values of at least one physical variable that are derived and/or calculated therefrom is stored for a defined number of signal processing steps and/or for a defined storage time period. In this case or thereafter, the anticipatory and/or predictive calculation and/or estimation of the probable and/or predictive accuracy measure or the anticipatory and/or predictive calculation and/or estimation of a period of time or a defined number of signal processing steps in the future takes place, on the basis of a prescribed accuracy measure or a prescribed threshold value for an accuracy measure taking into account the time profile or a trend or the changes in the stored data and/or values for physical variables and/or characteristic quantities or sets of characteristic quantities. In this case, it is particularly assumed that new measurement data or data follow the previous profile or trend and/or that the system properties, particularly preferably based on the measurement data, do not substantially change.

It is expedient that a defined minimum accuracy is estimated or calculated as the accuracy measure.

The accuracy measure is convertable, in particular, or is converted by the signal processing device into an uncertainty measure.

It is preferred that the signal processing device has a fusion filter that provides a defined fusion data record in the course of the collective evaluation of at least the sensor signals and/or signals derived therefrom from the sensor elements, wherein said fusion data record has in each case data for defined physical variables, wherein the fusion data record includes, for at least one physical variable, a value of said physical variable and a piece of information about the data quality thereof.

The accuracy measure or the information about the accuracy is expediently provided for at least one value of one or more or all the physical variables of the fusion data record.

The accuracy measure or the information about the accuracy is preferably provided for all the output values of all the variables, particularly all the physical variables, that are output variables from the sensor system.

Measurement data are expediently understood to mean the output signals or data from the sensor elements or sensor information source channels.

The fusion filter is preferably in the form of a Kalman filter, with alternative preference in the form of a particle filter, or alternatively in the form of an information filter or alternatively in the form of an "unscented" Kalman filter.

It is preferred that the fusion filter is in a form such that the fusion data record includes a relative value, particularly an offset value and/or change value and/or correction value and/or error value, as the value of the at least one physical variable.

It is expedient that the relative values of the respective physical variables of the fusion data record are correction values that each have an associated piece of variation information or a variation or variation measure, in particular a variance, as information about the data quality thereof.

It is preferred that the fusion filter is in a form such that the value of at least one physical variable of the fusion data record is calculated on the direct or indirect basis of sensor signals from a plurality of sensor elements, wherein these sensor elements sense this at least one physical variable redundantly in a direct or indirect manner. This redundant sensing is particularly preferably implemented as direct or parallel redundancy and/or implemented as analytical redundancy, from computationally derived or deduced variables/values and/or model assumptions.

The fusion filter is preferably in the form of a Kalman filter that iteratively carries out at least prediction steps and correction steps and at least to some extent provides the fusion data record. In particular, the fusion filter is in the form of an error state space extended sequential Kalman filter, that is to say in the form of a Kalman filter, that particularly preferably includes a linearization and in which error state information is calculated and/or estimated and/or that operates sequentially and in this case uses/takes into account the input data available in the respective function step of the sequence.

It is expedient that the sensor system has an inertial sensor arrangement, including at least one acceleration sensor element and at least one rate of rotation sensor element, and that the sensor system includes a strapdown algorithm unit, in which a strapdown algorithm is carried out, by means of which at least the sensor signals from the inertial sensor arrangement are processed to form, in particular corrected, navigation data and/or driving dynamics data, based on the vehicle in which the sensor system is arranged.

It is particularly preferred that the strapdown algorithm unit provides its calculated navigation data and/or driving dynamics data for the fusion filter directly or indirectly.

The sensor system preferably has an inertial sensor arrangement that is in a form such that it can sense at least the acceleration along a second defined axis, particularly the transverse axis of the vehicle, and at least the rate of rotation about a third defined axis, particularly the vertical axis of the vehicle, wherein the first and third defined axes form a generating system, and in this case are oriented in particular perpendicularly with respect to one another, wherein the sensor system furthermore has at least one wheel speed sensor element, particularly at least or precisely four wheel speed sensor elements, which sense the wheel speed of a wheel or the wheel speeds of a respective one of the wheels of the vehicle and in particular additionally sense the direction of rotation of the associated wheel of the vehicle in which the sensor system is arranged, wherein the sensor system additionally includes at least one steering angle sensor element that senses the steering angle of the vehicle, and wherein the sensor system furthermore includes a satellite navigation system that is particularly in a form such that it captures and/or provides the distance data in each case between the associated satellite and the vehicle or a variable that is dependent thereon and also speed information data in each case between the associated satellite and the vehicle or a variable that is dependent thereon.

With particular preference, the inertial sensor arrangement is in a form such that it can sense at least the accelerations along a first, a second and a third defined axis, and at least the rates of rotation about this first, about this second and about this third defined axis, wherein said first, second and third defined axes form a generating system, and in this case are oriented particularly in each case perpendicularly with respect to one another.

It is preferred that the inertial sensor arrangement provides its sensor signals for the strapdown algorithm unit, and the strapdown algorithm unit is in a form such that it calculates and/or provides at least from the sensor signals from the inertial sensor arrangement and also particularly from at least one piece of error state information and/or variance and/or piece of information about the data quality that is associated with a sensor signal or with a physical variable and is provided by the fusion filter, as measurement variables and/or navigation data and/or driving dynamics data, at least corrected accelerations along the first, second and third defined axes, at least corrected rates of rotation about these three defined axes, at least one speed with respect to these three defined axes, and at least one position variable.

It is expedient that the sensor system is in a form such that in each case at least one sensor signal and/or a physical variable as a direct or derived variable of the inertial sensor arrangement and/or of the strapdown algorithm unit, of the wheel speed sensor elements and of the steering angle sensor element, in particular indirectly via a vehicle model unit, and also of the satellite navigation system, in this case in particular distance data in each case between the associated satellite and the vehicle or a variable that is dependent thereon and also speed information data in each case between the associated satellite and the vehicle or a variable that is dependent thereon, are provided for the fusion filter and taken into account by the fusion filter during the calculations thereof.

It is particularly preferred that the vehicle model unit is in a form such that, from the sensor signals from the wheel speed sensor elements and from the steering angle sensor element, the speed along the first defined axis, the speed along the second defined axis and the rate of rotation about the third defined axis are calculated.

It is quite particularly preferred that the vehicle model unit is in a form such that it uses for calculation a least square error method for solving an overdetermined system of equations, known in particular as a least squared error method.

It is expedient that the vehicle model unit is in a form such that it takes into account at least the following physical variables and/or parameters during its calculation:
a) the steering angle of each wheel, sensed in particular by the steering angle sensor for the two front wheels, wherein the model assumption is made that the steering angle of the rear wheels is equal to zero or that the steering angle of the rear wheels is additionally sensed,
b) the wheel speed or a variable that is dependent thereon for each wheel,
c) the direction of rotation of each wheel,
d) the dynamic radius and/or wheel diameter of each wheel, and
e) the track width of each axle of the vehicle and/or the wheel base between the axles of the vehicle.

The signal processing device is preferably in a form such that the fusion filter calculates and/or provides and/or outputs the fusion data record at defined instants.

The fusion filter is preferably in a form such that it calculates and/or provides and/or outputs the fusion data record independently of the sampling rates and/or sensor signal output instants of the sensor elements, particularly of the wheel speed sensor elements and the steering angle sensor element, and independently of temporal signal or measured variable or information output instants of the satellite navigation system.

It is expedient that the signal processing device is in a form such that in the course of a function step of the fusion filter always, in particular asynchronously, the newest— available to the fusion filter—information and/or signals and/or data from the sensor elements, particularly from the wheel speed sensor elements and the steering angle sensor element, directly or indirectly, particularly by means of the vehicle model unit, and from the satellite navigation system directly or indirectly, are sequentially updated and/or included in the fusion filter and are taken into account during the calculation of the associated function step of the fusion filter.

Furthermore, the invention relates to the use of the sensor system in vehicles, particularly motor vehicles, particularly preferably in automobiles.

In addition, the invention relates particularly to a method that is executed or carried out in the sensor system and is disclosed by the above embodiment options/possibilities of the sensor system for the possible method variants.

BRIEF DESCRIPTION OF THE DRAWING

Further preferred embodiments are evident from the subclaims and the description below of an exemplary embodiment with reference to FIG. 1.

FURTHER DESCRIPTION OF THE INVENTION

FIG. 1 shows a schematic illustration of an exemplary embodiment of the sensor system that is provided for arrangement and use in a vehicle. In this case, the sensor elements and the satellite navigation system and also the most important signal processing units of the signal processing device are illustrated as function blocks, as is their interaction among one another.

The sensor system includes an inertial sensor arrangement 1, IMU, "inertial measurement unit", which is in a form such that it can sense at least the accelerations along a first, a second and a third defined axis and at least the rates of rotation about this first, about this second and about the third defined axis, wherein the first defined axis corresponds to the longitudinal axis of the vehicle, the second defined axis corresponds to the transverse axis of the vehicle and the third defined axis corresponds to the vertical axis of the vehicle. These three axes form a Cartesian coordinate system, the vehicle coordinate system.

The sensor system has a strapdown algorithm unit 2 in which a strapdown algorithm is performed, said strapdown algorithm being used to process at least the sensor signals from the inertial sensor arrangement 1 to form corrected navigation data and/or driving dynamics data. These output data from the strapdown algorithm unit 2 may include the data of the following physical variables: the speed, the acceleration and the rate of rotation of the respective vehicle, for example in respect of the three axes of the vehicle coordinate system and, on the basis of the example, additionally in each case based on a world coordinate system that is suitable for describing the orientation and/or dynamic variables of the vehicle in the world. Moreover, the output data from the strapdown algorithm unit 2 includes the position in respect of the vehicle coordinate system and the orientation in relation to the world coordinate system. In addition, the output data from the strapdown algorithm unit have the variances as information about the data quality of the physical variables cited above, at least some of them. On the basis of the example, these variances are not calculated in the strapdown algorithm unit, but rather only used and forwarded by the latter.

The output data from the strapdown algorithm unit are, by way of example, moreover the output data or signals or output data 12 from the entire sensor system.

Moreover, the sensor system includes wheel speed sensor elements 3 for each wheel of the vehicle, on the basis of the example four, which each sense the wheel speeds of one of the wheels of the vehicle and each additionally sense the direction of rotation, and additionally a steering angle sensor element 3 that senses the steering angle of the vehicle. The wheel speed sensor element and the steering angle sensor element form a sensor arrangement 3 for sensing the odometry.

Furthermore, the sensor system has a satellite navigation system 4 that is in a form such that it senses and/or provides the distance data in each case between the associated satellite and the vehicle or a variable that is dependent thereon and also speed information data in each case between the associated satellite and the vehicle or a variable that is dependent thereon. In addition, the satellite navigation system 4, on the basis of the example, provides the fusion filter with a starting position or piece of starting position information, at least in order to start or switch on the sensor system.

Moreover, the signal processing device of the sensor system includes a fusion filter 5. In the course of the collective evaluation of at least the sensor signals and/or signals derived therefrom from the sensor elements 3, that is to say the odometry, and of the output signals from the satellite navigation system 4 and/or signals derived therefrom, the fusion filter 5 provides a defined fusion data record 6. This fusion data record has respective data for defined physical variables, with the fusion data record 6 including, for at least one physical variable, a value for this physical variable and a piece of information about the data quality thereof, this information about the data quality being embodied as a variance on the basis of the example.

The fusion data record 6 includes a relative value, for example a correction value, also called an offset value, as a value for the at least one physical variable. On the basis of the example, the correction value is obtained in each case from the accumulated error values or change values that are provided by the fusion filter 5.

On the basis of the example, the relative values of the respective physical variables of the fusion data record 6 are thus correction values and variances. On the basis of the example, the fusion data record 6, in other words, calculates an error budget that is provided as an input variable or input data record for the strapdown algorithm unit and is at least to some extent taken into account by said strapdown algorithm unit during its calculations. This error budget includes, as a data record or output data, at least correction values or error values for physical variables and also in each case a variance, as a piece of information about the data quality, for each value. In this case, the fusion filter transmits to the strapdown algorithm unit at least the correction values and variances for the physical variables speed, acceleration and rate of rotation, in each case based on the vehicle coordinate system, that is to say in each case the three components of these variables in relation to this coordinate system, and also IMU orientation or the IMU orientation angle between the vehicle coordinate system and the coordinate system or the installation orientation of the inertial sensor arrangement 1 and also the position based on the world coordinate system.

The values of the physical variables of the fusion data record are calculated on the direct or indirect basis of the sensor signals from the sensor elements 3 and from the satellite navigation system 4, with at least some variables, for example the speed and the position of the vehicle in relation to the vehicle coordinates, being sensed and used in a redundant manner with respect to the data of the strapdown algorithm unit 2.

On the basis of the example, the fusion filter 5 is in the form of an error state space extended sequential Kalman filter, that is to say in the form of a Kalman filter that includes a linearization, in particular, and in which the correction values are calculated and/or estimated and that operates sequentially and in this case uses/takes into account the input data available in the respective function step of the sequence.

The fusion filter 5 is in a form such that in the course of a function step of the fusion filter always, asynchronously, the newest—available to the fusion filter—information and/or signals and/or data from the sensor elements 3, that is to say from the wheel speed sensor elements and the steering angle sensor element indirectly by means of a vehicle model unit 7, and from the satellite navigation system 4 directly or indirectly, are sequentially updated and/or included in the fusion filter and are taken into account during the calculation of the associated function step of the fusion filter 5.

The vehicle model unit 7 is in a form such that it calculates, from the sensor signals from the wheel speed sensor elements 3 and from the steering angle sensor element 3, at least the speed along a first defined axis, the speed along a second defined axis and the rate of rotation about a third defined axis and provides them for the fusion filter 5.

On the basis of the example, the sensor system has four wheel speed sensor elements 3, wherein in each case one of the wheel speed sensor elements is associated with each wheel of the vehicle, wherein the vehicle model unit 7 is in a form such that, from the sensor signals from the wheel speed sensor elements and the steering angle, provided by the steering angle sensor unit, and/or the steering angle of each wheel, in particular sensed by the steering angle sensor element for the front wheels and by means of at least one further steering angle sensor element for the rear wheels or at least from a model assumption for the rear wheels, said vehicle model unit directly or indirectly calculates the speed components and/or the speed, of each wheel, along/in relation to the first and second defined axes, wherein, from these eight speed components and/or the four speeds in each case in relation to the first and second defined axes, the speed along a first defined axis, the speed along a second defined axis and the rate of rotation about a third defined axis are calculated.

The sensor system or the signal processing device thereof moreover includes a tire parameter estimation unit 10 that is in a form such that it calculates at least the radius, on the basis of the example the dynamic radius, of each wheel and additionally calculates the cornering stiffness and the slip stiffness of each wheel and provides them for the vehicle model unit 7 as additional input variables, wherein the tire parameter estimation unit 10 is in a form such that it uses a substantially linear tire model for calculating the wheel/tire variables. The input variables of the tire parameter estimation unit on the basis of the example are in this case the wheel speeds 3 and the steering angle 3, at least to some extent or completely the output variables or values from the strapdown algorithm unit 2, particularly the variances provided thereby in addition to the values of the physical variables, and also the variances of the fusion filter 5, with respect to the physical variables that are the input variables for the tire parameter estimation unit 10.

The sensor system or the signal processing device thereof moreover includes a GPS error recognition and plausibilization unit 11 that is in a form such that, on the basis of the example, it receives as input data the output data or output signals from the satellite navigation system 4 and also at least to some extent the output data or output signals from the strapdown algorithm unit 2 and takes them into account in its calculations.

In this case, the GPS error recognition and plausibilization unit 11 is additionally connected to the fusion filter 5 and interchanges data with the latter.

By way of example, the GPS error recognition and plausibilization unit 11 is in a form such that it carries out the following method:

Method for selecting a satellite, including:
measurement of measurement position data for the vehicle relative to the satellite on the basis of the GNSS signal, that is to say the global navigation satellite system signal, the output signal or the output data from the satellite navigation system 4,
determination of reference position data for the vehicle that are redundant with respect to the measurement position data determined on the basis of the GNSS signal; and
selection of the satellite if a comparison of the measurement position data and the reference position data satisfies a predetermined condition,
wherein a difference between the measurement position data and the reference position data is formed for the purpose of the comparison of the measurement position data and the reference position data,
wherein the predetermined condition is a maximum permissible error between the error position data and the reference position data,
wherein the maximum permissible error is dependent on a standard deviation that is calculated on the basis of a sum of a reference variance for the reference position data and a measurement variance for the measurement position data,
wherein the maximum permissible error corresponds to a multiple of the standard deviation such that a probability that the measurement position data are in a variation interval that is dependent on the standard deviation is below a predetermined threshold value.

The sensor system or the signal processing device thereof moreover has a standstill recognition unit 8 that is in a form such that it can recognize when the vehicle is at a standstill and, in the event of it having been recognized that the vehicle is at a standstill, provides at least the fusion filter 5 with information from a standstill model, in this case particularly the information that the rates of rotation about all three axes have the value zero and at least one position change variable likewise has the value zero and also particularly the speeds along all three axes have the value zero. On the basis of the example, the standstill recognition unit 8 is in this case in a form such that it uses the wheel speeds or wheel speed signals as input data, and also the "raw" or direct output signals from the inertial sensor arrangement 1.

On the basis of the example, the signal processing device calculates and/or uses a first group of data of physical variables whose values relate to a vehicle coordinate system and additionally calculates and/or uses a second group of data of physical variables whose values relate to a world coordinate system, wherein this world coordinate system is suitable particularly at least for describing the orientation and/or dynamic variables of the vehicle in the world, wherein the sensor system has an orientation model unit 9 that is used to calculate the orientation angle between the vehicle coordinate system and the world coordinate system.

The orientation angle between the vehicle coordinate system and the world coordinate system in the orientation model unit 9 is calculated at least on the basis of the following variables:

the speed in relation to the vehicle coordinate system, the speed in relation to the world coordinate system and the steering angle.

On the basis of the example, the orientation angle between the vehicle coordinate system and the world coordinate system is calculated in the orientation model unit 9 additionally at least on the basis of one or more of the following variables:

a piece of orientation information for the vehicle based on the world coordinate system, some or all of the correction values and/or variances of the fusion filter and/or the acceleration of the vehicle based on the vehicle coordinate system and/or the world coordinate system.

The orientation model unit 9 uses some or all of the output data and/or output signals from the strapdown algorithm unit 2 for calculation.

On the basis of the example, the orientation model unit 9 is in a form such that, in addition to the orientation angle, it also calculates and provides a piece of information about the data quality of this variable, particularly the variance of the orientation angle, wherein the orientation model unit 9 provides the orientation angle between the vehicle coordinate system and the world coordinate system and also the information about the data quality of this variable for the fusion filter 5, and the fusion filter uses this orientation angle in its calculations and particularly preferably forwards the information about the data quality of this variable, particularly the variance of the orientation angle, to the strapdown algorithm unit 2.

On the basis of the example, the information about the accuracy or the characteristic quantity or the set of characteristic quantities is provided for each value of each physical variable at or after each or each essential signal processing step and for each signal source. On the basis of the example, this is in parallel with the signal processing of the values of the physical variables from the sensor elements through to the output signals from the sensor system.

On the basis of the example, the unprocessed raw values or measured values from the sensor elements in this case form the source of the description of the characteristic quantities or of the set of characteristic quantities. These are modified during the further processing of signals per signal processing step.

By way of example, the further processing is classified into three operations: integration, differentiation and filtering. Calculation in accordance with the error class and the error propagation calculation need to be applied; the effects on the characteristic quantities are described by way of example below.

Error propagation in the case of integration as a signal processing step for the signal:
Noise: change in the characteristic, weighting of the power density at $f^2$.
Offset/bias: becomes a drift over the integration time
Scale factor: remains a factor of the integrated signal
Nonlinearity: cancels itself out in the long-term mean over the entire measurement range
Drift: becomes square drift over the integration time
Bandwidth/cutoff frequency: no change, but different characteristic:

$$\frac{1}{f}$$

Delay/dead time: persists, delay in the integral sum
Error propagation in the case of differentiation as a signal processing step for the signal:
Noise: change in the characteristic, weighting of the power density at $f^2$.
Offset/bias: disappears through differentiation
Scale factor: remains a factor of the differentiated signal
Nonlinearity: becomes an operating-point-dependent offset
Drift: becomes an offset
Bandwidth/cutoff frequency: change in the characteristic (high-pass filter character: f)
Delay/dead time: persists
Error propagation in the case of general filtering as a signal processing step for the signal:
Noise characteristic is altered
Change in the bandwidth/cutoff frequencies in line with the filtering
Delay/dead time is extended by
Group propagation delay within the bandwidth
Processing time of the digital filter The accuracy statement about the accuracy measure in the form of the characteristic quantities or the set of characteristic quantities allows—for example in a description based on data sheets—the characterization of measurement data from their source by the signal processing chain of the signal processing device through to their sink, that is to say the output data from the sensor system. On the basis of the example, the accuracy description involves the actual properties of individual measurement data or data of physical variables being addressed by continuously calculating the dynamic specification thereof using the accuracy rating based on a description from data sheets, for example.

These description data or characteristic quantities can be used for at least one user function of the sensor system or of a regulatory system or control system connected to the sensor system. By way of example, adaptive regulation or the accuracy-dependent provision of supplementary functions of driver assistance systems is thus possible.

While the above description constitutes the preferred embodiment of the present invention, it will be appreciated that the invention is susceptible to modification, variation and change without departing from the proper scope and fair meaning of the accompanying claims.

The invention claimed is:

1. A sensor system, comprising:
    a plurality of sensor elements configured to sense different primary measured variables or use different measurement principles;
    a signal processing device configured to evaluate sensor signals from the sensor elements collectively and to rate the information quality of the sensor signals;
    wherein the signal processing device provides information about the accuracy of at least one datum of a physical variable;
    the signal processing device in a form such that the information about the accuracy is described in at least one characteristic quantity; and
    in that the signal processing device is configured to perform an anticipatory or a predictive calculation of at least one accuracy measure for at least one value of a physical variable, wherein the at least one value of the physical variable and the associated accuracy measure are based on a probable or a predictive presence thereof at or after one or more signal processing steps before one or more of the signal processing steps are performed.

2. The sensor system as claimed in claim 1, further comprising in that the signal processing device further comprises at least one sensor information source channel configured to forward and process at least one output signal from at least one of the sensor elements.

3. The sensor system as claimed in claim 1, further comprising:
in that the signal processing device provides the at least one characteristic quantity in each case for the at least one datum of a physical variable after or at successive signal processing steps of the signal processing device; and
the at least one datum of the at least one characteristic quantity is dependent on how an associated or a preceding signal processing step influences the at least one datum of the physical variable to which the at least one characteristic quantity relates.

4. The sensor system as claimed in claim 1, further comprising:
in that the signal processing device is configured such that the at least one characteristic quantity is defined as at least one of the following variables in order to describe a data quality:
a noise characteristic quantity,
an offset/bias characteristic quantity,
a scale factor characteristic quantity,
a nonlinearity characteristic quantity,
an offset and/or scale factor drift characteristic quantity,
a bandwidth/cutoff frequency characteristic quantity, and
a delay/dead time characteristic quantity.

5. The sensor system as claimed in claim 1, further comprising:
in that the signal processing device is configured such that the at least one characteristic quantity forms a set of the characteristic quantities and includes at least three or all of the following variables:
a data quality,
a noise characteristic quantity,
an offset/bias characteristic quantity,
a scale factor characteristic quantity,
a nonlinearity characteristic quantity,
an offset and/or scale factor drift characteristic quantity,
a bandwidth/cutoff frequency characteristic quantity, and
a delay/dead time characteristic quantity.

6. The sensor system as claimed in claim 1, further comprising in that the signal processing device is configured to provide the at least one characteristic quantity for each of the at least one datum of a defined physical variable after or at each signal processing step.

7. The sensor system as claimed in claim 1, further comprising in that the signal processing device is configured to provide the at least one characteristic quantity for each of the at least one datum of a plurality of defined physical variables, which are output variables from the sensor elements, at or after each essential signal processing step and for each sensor signal, for the output of at least one sensor element of the plurality of sensor elements.

8. The sensor system as claimed in claim 1, further comprising in that the signal processing device is configured such that a set of the at least one characteristic quantity directly forms an accuracy measure, or an accuracy measure is described indirectly on the basis of a plurality of the characteristic quantities from the set of characteristic quantities.

9. The sensor system as claimed in claim 8, further comprising in that the signal processing device is configured such that the accuracy measure is rated in respect of a threshold value and then the at least one datum of a physical variable is assigned a rating in respect of the accuracy, based upon whether the relevant datum of the physical variable is provided with sufficient or insufficient accuracy, and the rating of the accuracy is taken into account in at least one of the subsequent signal processing steps.

10. The sensor system as claimed in claim 1, further comprising in that the signal processing device is configured such that, in the course of the anticipatory or the predictive calculation, the signal processing device relates the probable or predictive presence of the accuracy measure to a defined period of time from a current instant to a defined instant in the future, the defined instant in the future occurring at or after a signal processing step.

11. The sensor system as claimed in claim 1, further comprising in that the signal processing device is configured such that, in the course of the anticipatory or predictive calculation, the signal processing device uses data or measurement data that are available in the sensor system.

12. The sensor system as claimed in claim 1, further comprising in that the signal processing device is configured such that the anticipatory or the predictive calculation is performed repeatedly or at least twice in succession, the repetition or the succession being based on successive signal processing steps, and the repeated or the at least twice-successive predictive calculation relating to the same instant or signal processing step in the future at or after which the predicted accuracy measure is present, wherein potentially newly added measurement data from one or more sensor information from the sensor elements are taken into account in the course of the repeated calculation.

13. The sensor system as claimed in claim 1, further comprising in that the signal processing device is configured such that, in the course of the anticipatory or the predictive calculation, the defined period of time from a current instant to a defined instant in the future or a defined number of signal processing steps, before the signal processing steps are performed, are prescribed and, on the basis thereof, the accuracy measure is calculated for a value of a physical variable at instant in the future or at or after this future signal processing step and at the same time or thereafter the accuracy measure is rated in respect of a threshold value.

14. The sensor system as claimed in claim 1, further comprising in that the signal processing device is configured such that, in the course of the anticipatory or the predictive calculation, the accuracy measure is prescribed for a value that is present in the future for a physical variable and, on the basis thereof, the defined period of time from a current instant to a defined instant in the future is calculated or a defined number of future signal processing steps are calculated, until the accuracy measure drops below or rises above a fined threshold value.

* * * * *